United States Patent [19]

McClintock et al.

[11] Patent Number: 5,276,501
[45] Date of Patent: Jan. 4, 1994

[54] FABRY-PEROT READOUT TECHNIQUE USING WAVELENGTH TUNING

[75] Inventors: Joseph A. McClintock, Baltimore; Jeffrey P. Andrews, Abingdon, both of Md.

[73] Assignee: Martin Marietta Corporation, Bethesda, Md.

[21] Appl. No.: 972,397

[22] Filed: Nov. 6, 1992

[51] Int. Cl.$^5$ ............................................. G01B 9/02
[52] U.S. Cl. ...................... 356/352; 356/345; 356/349; 356/357; 356/358; 250/227.19; 250/227.27
[58] Field of Search ............... 356/352, 345, 349, 357, 356/358; 250/227.19, 227.27

[56] References Cited

U.S. PATENT DOCUMENTS

| | | | |
|---|---|---|---|
| 4,873,989 | 10/1989 | Einzig . | |
| 4,881,813 | 11/1989 | Koo et al. . | |
| 4,924,477 | 5/1990 | Gilmore et al. | 356/358 |
| 4,948,254 | 8/1990 | Ishida | 356/358 |
| 4,974,961 | 12/1990 | Jackson et al. | 356/345 |
| 5,094,534 | 3/1992 | Cole et al. . | |

OTHER PUBLICATIONS

J. P. Andrews, "Hybrid fiber optic strain sensor resolves directional ambiguity of time multiplexed Fabry-Perot," *Smart Materials and Structures Series, Active Materials and Adaptive Structure, Proceedings of the ADPA/AIAA/ASME/SPIE Conference on Active Materials and Adaptive Structures*, Nov. 4-8, 1991, Alexandria, Virginia, Gareth J. Knowles, Editor, pp. 661-665.

Awad Samir Gerges, T. P. Newson, D. A. Jackson, "Coherence tuned fiber optic sensing system, with self-initialization, based on a multimode laser diode," *Applied Optics*, Oct. 20, 1990, vol. 29, No. 30, pp. 4473-4480.

Kent A. Murphy, Michael F. Gunther, Ashish M. Vengasarkar, and Richard O. Claus, "Quadrature phase-shifted, extrinsic Fabry-Perot optical fiber sensors," *Optic Letters*, Feb. 5, 1991, vol. 16, No. 4, pp. 273-275.

Brian R. Fogg, Anbo Wang, Mark S. Miller, Kent A. Murphy, and Richard O. Claus, "Optical fiber sensor for absolute measurement," *Fiber Optic Sensor-Based Smart Materials and Structures Workshop*, Blacksburg VA, Apr. 15-16, 1992.

*Primary Examiner*—Davis L. Willis
*Assistant Examiner*—Robert Kim
*Attorney, Agent, or Firm*—Kenyon & Kenyon

[57] ABSTRACT

A method for sensing an environmental parameter includes the step of sensing the environmental parameter with an interferometer sensor that has a light source emitting a tunable wavelength of light and a gap that changes in length in response to the environmental parameter. The interferometer has a sinusoidal output curve that oscillates in intensity in response to changes in gap length. The wavelength of light emitted by the light source is tuned to a first wavelength to provide a first output value. Similarly, the wavelength of light emitted by the light source is next tuned to a second wavelength to provide a second output value. The first and second output values correspond to points on the sinusoidal output curve that differ by at least half a cycle. The gap length is then calculated from the values of the first wavelength and the difference between the first and second wavelengths. Finally, the value of the environmental parameter is determined from the value of the gap length.

20 Claims, 2 Drawing Sheets

FABRY-PEROT READOUT TECHNIQUE USING WAVELENGTH TUNING

BACKGROUND OF THE INVENTION

Extrinsic Fabry-Perot interferometers are used to measure quantities such as strain, temperature, pressure, and displacement. Interferometers of this type are advantageous for use in embedded sensing applications for a number of reasons. For example, extrinsic Fabry-Perot interferometers offer the high sensitivity typical of an interferometer while at the same time overcoming many of the common drawbacks associated with interferometers. In particular, extrinsic Fabry-Perot interferometers are insensitive to polarization and have good thermal stability. The thermal drift of these interferometers is expected to be about 0.0002 fringes per 100 C.

One problem encountered when Fabry-Perot interferometers are employed as sensors relates to the known methods for analyzing the output data. A simple well-known output method is fringe counting, but this method does not provide absolute, unambiguous data. In particular, fringe-counting can only measure changes in sensor length and it cannot distinguish between tension and compression. Accordingly, while fringe counting may be adequate in a controlled laboratory environment, the technique is inadequate for more typical environments.

Therefore, given the problems associated with the known methods for analyzing data from a Fabry-Perot interferometer, there is a need for a technique to absolutely measure environmental parameters such as sensor strain.

SUMMARY OF THE INVENTION

The present invention relates to a method for sensing an environmental parameter that overcomes the deficiencies noted above. The method includes the step of sensing the environmental parameter with an interferometer sensor that has a light source emitting a tunable wavelength of light and a gap that changes in length in response to the environmental parameter. The interferometer has a sinusoidal output curve that oscillates in intensity in response to changes in gap length. The wavelength of light emitted by the light source is tuned to a first wavelength to provide a first output value. Similarly, the wavelength of light emitted by the light source is next tuned to a second wavelength to provide a second output value. The first and second output values correspond to points on the sinusoidal output curve that differ by at least half a cycle. The gap length is then calculated from the values of the first wavelength and the difference between the first and second wavelengths. Finally, the value of the environmental parameter is determined from the value of the gap length.

A laser diode may be employed as the light source in the interferometer. The wavelength of light emitted by such diodes vary with temperature. Accordingly, the wavelength of light can be accurately tuned or adjusted by varying the temperature of the diode. By employing the method of the present invention, absolute gap length and hence absolute values of the environmental parameter can be measured.

The above is a brief description of some of the deficiencies in known methods for analyzing data from a Fabry-Perot interferometer and advantages of the present invention. Other features, advantages and embodiments will be apparent to those skilled in the art from the following description, accompanying drawings and appended claims.

DETAILED DESCRIPTION

Figure 1:
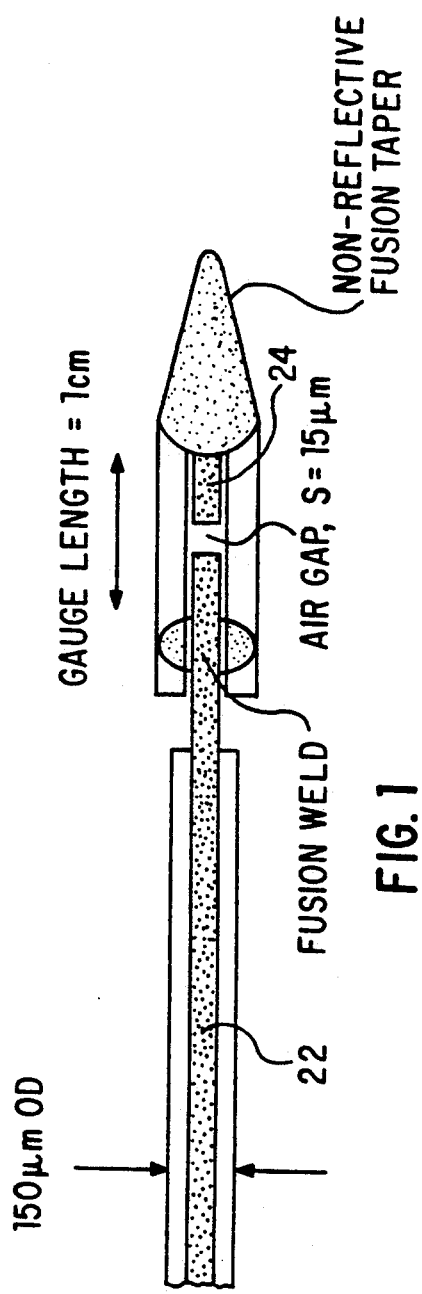
FIG. 1 schematically illustrates a portion of the Fabry-Perot interferometer used in connection with the method of the present invention.

FIG. 1 schematically illustrates an extrinsic Fabry-Perot interferometer. Two optical fibers 22 and 24 are fixed inside a tubing to form an air gap therebetween. The optical fibers 22 and 24 are fused in place by fusion welds. The fusion weld to the lead-out fiber is expanded into a complete welded fiber taper. Two interfering optical beams are produced by the air gap. The first beam is created by the Fresnel reflection at the glass/air interface of the lead-in fiber 22 and the second beam is created by the glass/air interface of the lead-out fiber 24.

The interferometer sensor employed by the present invention uses uncoated fiber ends so that the reflectivity of each fiber is approximately 4%. Accordingly, this is a low finesse Fabry-Perot interferometer; multiple reflections make a very small contribution to the output signal and thus a two-beam interference model may be used to describe the reflected signal that is detected. According to such a model, the output intensity of the reflective Fabry-Perot interferometer is described by:

$$I = E_1^2 + E_2^2 + 2E_1 \cdot E_2 \cos(\phi) \quad (1)$$

where $E_1$ and $E_2$ are the electric field amplitudes of the interfering beam that does not traverse the gap and the interfering beam that does traverse the gap, respectively, and $$\phi = 4\pi s/\lambda + \pi; \text{ where } s \text{ is the gap length.} \quad (2)$$

The value of $E_2$ depends both on both the reflectivity of the second fiber face and the gap length S. Therefore, it is important to keep the gap length S sufficiently small to maintain a usable value for $E_2$.

The gap length S may be measured by a technique referred to as wavelength tuning. According to this method, the laser diode forming the light source of the interferometer is initially adjusted to a wavelength $\lambda_1$. This wavelength is chosen such that the two beams interfere to produce either a minimum or maximum intensity at the output of the interferometer. In other words, the laser is tuned to a wavelength $\lambda_1$ corresponding to a fringe peak. Next, the laser's wavelength is varied until the next minimum or maximum intensity is reached, which corresponds to a wavelength $\lambda_2$. That is, the laser is tuned from the first fringe peak to the adjacent fringe peak so that the output intensity goes through a complete 360 degree cycle from a maximum back to a maximum (or, alternatively, a minimum to a minimum). Since the second fringe peak is out of phase from the first fringe peak by a value of $2\pi$, equation (2) for the wavelengths $\lambda_1$ and $\lambda_2$ becomes:

$$\phi = 4s\pi/\lambda_1 + \lambda \qquad 3(a)$$

$$\phi + 2\pi = 4s\pi/\lambda_2 + \pi \qquad 3(b)$$

Since the two equations contain two variables, they can be solved simultaneously to provide a unique value for the gap length S:

$$S = \frac{\lambda_1 \lambda_2}{2(\lambda_1 - \lambda_2)} \qquad (4)$$

As equation (4) indicates, wavelength tuning may be used to measure absolute gap lengths and hence absolute strain values. If a different technique is employed for real time strain readout, this technique is useful for measuring gap length after sensor fabrication and at system power-up to determine the initial strain level.

Equation (4) is written in terms of the two wavelengths used to produce adjacent fringes at the output of the interferometer. Laser diodes typically have a base wavelength that may be varied or tuned to a relatively small degree. Accordingly, it is useful to refer to the base wavelength as $\lambda_1$ and to rewrite $\lambda_2$ in terms of the change from $\lambda_1$. In other words, $\lambda_1$ and $\lambda_2$ may be related by the equality $\Delta\lambda = \lambda_1 - \lambda_2$, where $\Delta\lambda$ is defined as the change in wavelength necessary to have the output intensity go through one complete 360 degree cycle. $\Delta\lambda$ will be referred to as the tuning range of the light source.

As the above discussion indicates, it would be useful to rewrite equation (4) in terms of $\lambda_1$ and $\Delta\lambda$. By making the appropriate substitution equation (4) becomes:

$$S = \frac{\lambda_1^2 + \lambda_1 \Delta\lambda}{2\Delta\lambda} = \frac{\lambda_1^2}{2\Delta\lambda} + \frac{\lambda_1}{2} \qquad (5)$$

If the small term $\lambda_1/2$ is neglected, this equation can be simplified to:

$$S \approx \frac{\lambda_1^2}{2\Delta\lambda} \qquad (6)$$

Equation 6 indicates that small changes in the gap length S are inversely proportional to the change in wavelength that the laser source must undergo to detect adjacent output fringes. For example, to measure a 1% change in gap length S requires a 1% change in the 8wavelength of the laser source relative to its initial base value. When there is no strain exerted on the sensor, the tuning range $\Delta\lambda$ that is necessary to measure the unstressed gap S is referred to as the zero strain tuning range.

Figure 2:
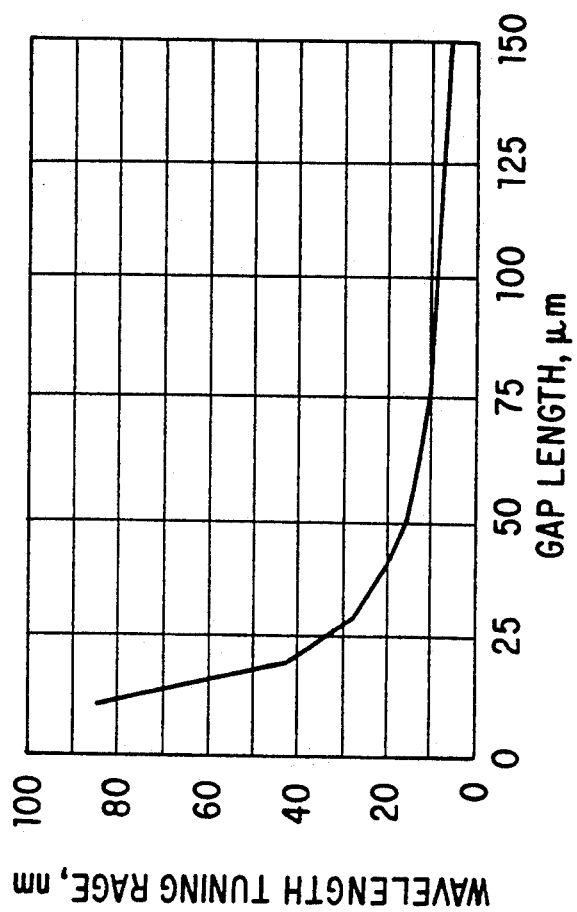
FIG. 2 graphically illustrates the required wavelength tuning range for sensor operation as function of sensor gap length for a base wavelength 1.3 microns.

FIG. 2 is a plot of equation 6 for a base wavelength $\lambda_1$ of 1.3 microns, which is a typical value for a laser diode. Gap length S is plotted on the abscissa and the wavelength tuning range $\Delta\lambda$ is plotted on the ordinate. It is clear from the curve that larger gap lengths require a smaller tuning range $\Delta\lambda$ than smaller gap lengths, thus placing less stringent demands on the laser diode. For short gap lengths the laser diode may not be able to accommodate the relatively large tuning range that is required to tune through a complete cycle. In such a case it may be necessary to tune between a maximum and minimum output value rather than between two maxima or two minima. The equation for tuning between a maximum and a minimum may be derived as above, except that in equation 3(b) a value of $\pi$ is used instead of $2\pi$ since the relative phase changes by only half a cycle.

Referring again to FIG. 1, the gauge length L of the interferometer sensor is defined as the distance between the welds that fix each of the two optical fibers in place. In the embodiment of the invention shown in FIG. 1 this distance is 1 cm.

The strain exerted on the sensor is defined as follows:

$$\text{strain} = \Delta L/L \qquad (7)$$

where $\Delta L$ is the change in gauge length due to the strain.

The change in the gauge length L due to the strain is equal to the change in the gap length S due to the strain. Accordingly, the strain can also be written as:

$$\text{strain} = \Delta S/L \qquad (8)$$

As this equation indicates, the greater the initial gauge length the smaller the strain that can be detected and hence the more sensitive the sensor.

The present invention will be further illustrated with a numerical example. Consider a sensor having a gauge length L of 1 cm and a gap length S of 100 μm. If a 1.3 μm laser is used, FIG. 2 indicates that the zero strain tuning range (i.e., the tuning range $\Delta\lambda$ required to measure the unstrained gap) would be about 8.45 nm. If a strain of 20 με is applied to the sensor, the change in gap length would be 0.2 μm, as calculated from equation (8). The new gap length after the strain is applied is equal to 100 μm + 0.2 μm = 100.2 μm, corresponding to a 0.2% change in gap length. The value of the tuning range $\Delta\lambda$ necessary to measure this new gap length can be determined from equation 6 by using the values $\lambda_1 = 1.3$ μm and S = 100.2 μm. Making the appropriate substitutions results in a value of $\Delta\lambda$ equal to 8.433 nm. Thus, it is necessary to measure a change in peak separation of $1.70 \times 10^{-2}$ nm (0.17 Å).

A laser diode that has integral coolers and thermistor temperature sensors can be tuned within the range calculated above. The wavelength of the light emitted by such a diode is a function of temperature, which may be precisely controlled. For example, a typical laser diode may have a wavelength that varies by 0.25 nm/C. over an operating range of 0 to 40 C. The temperature of the laser diode can be monitored by the change in resistance of the temperature sensor. Over the temperature range of 0 to 40 C. the resistance of a typical laser diode may change by at least 10 kΩ. If the wavelength is to be measured to within an accuracy of 0.2%, the resistance must be measured to within 0.2% $\times$ 40 kΩ = 20 Ω. Furthermore, since changes in the power supplied to the diode will affect the diode's temperature, it is also important to maintain the laser power to within roughly 1%.

For a larger strain that increases the gauge length of 1 cm by 0.5%, the gap length would change by 50 μm. If this strain were a compressive strain, the initial gap length of 100 μm would be reduced to 50 μm and a tuning range of 16.9 mn would be required to cover two adjacent fringe maxima. If the tuning range were assumed to be 10 nm, it would be necessary to tune between a maximum and minimum output value rather than over a complete cycle from a maximum to a maximum to stay within the tuning range.

Figure 3:
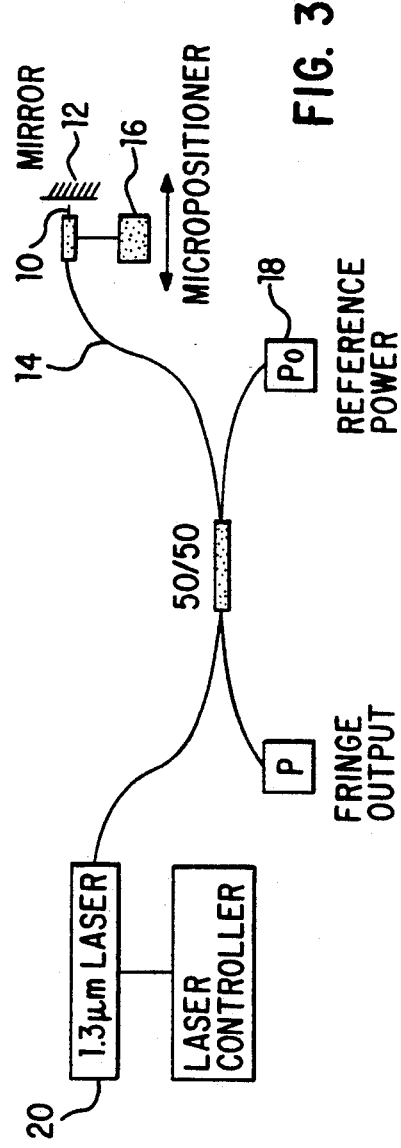
FIG. 3 schematically illustrates the Fabry-Perot interferometer used in connection with the method of the present invention.

One embodiment of the invention is shown in FIG. 3. The gap in the optical path of the interferometer is formed between the end face 10 of the fiber optic 14 and a planar mirror 12. The fiber optic 14 is mounted on a micropositioner 16 so that the gap length can be controlled with relative precision. The micropositioner has a resolution of 0.1 $\mu$m.

As FIG. 3 indicates, a detector 18 is used to directly measure the power level $P_o$ of the light emitted by the laser diode 20. This measurement is necessary because as the temperature of the laser diode 20 is varied, the power $P_o$ emitted by the laser varies. Because the variations in the power output due to changes in gap length are independent of the changes in the DC power level $P_o$, the sensor output is normalized by the factor $P_o$. Accordingly, the desired value to be measured is $P/P_o$.

Figure 4:
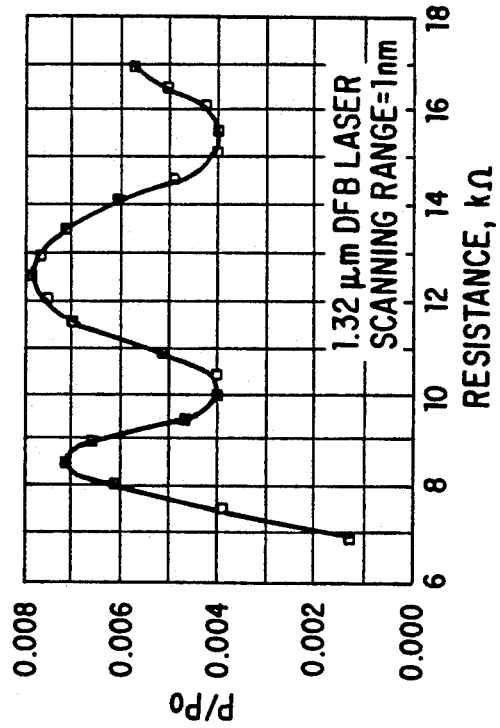
FIG. 4 shows the normalized sensor output as a function of laser diode thermistor resistance for a fixed gap length.

To determine the length of the unstressed gap the temperature of the diode laser 20 is varied through a predetermined range to vary the wavelength of light emitted by the laser 20. As the wavelength range is swept, the values of the reflected signal, P, and the power level, $P_o$, are recorded. FIG. 4 shows the ratio of P/Po plotted against the resistance of the thermoelectric cooler's controller. The resistance is proportional to both the temperature of the laser 20 and the wavelength of light emitted by the laser 20. The graph clearly shows two fringes corresponding to maxima in the output signal.

Figure 5:
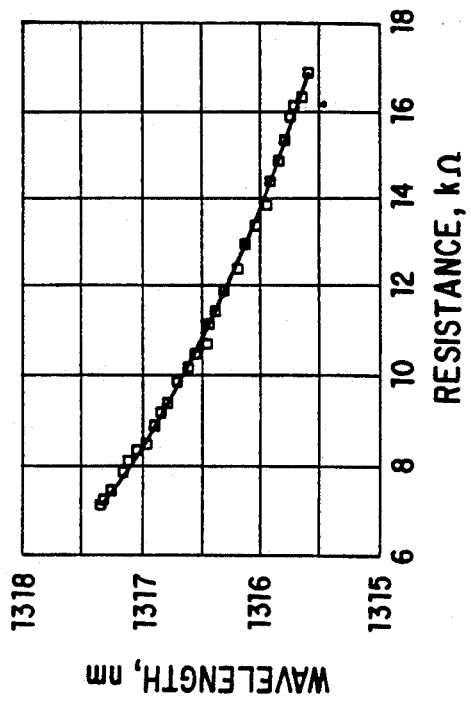
FIG. 5 graphically illustrates the experimentally determined relationship between laser diode thermistor resistance and emitted wavelength for the diode producing the output in FIG. 4.

To determine the value of the wavelengths corresponding to the two adjacent fringes in FIG. 4, and hence to determine the zero strain tuning range, the precise relationship between resistance and wavelength must be empirically determined for the particular laser diode 20 employed in the sensor. Accordingly, FIG. 5 shows a graph of the wavelength of light as a function of resistance for the laser diode 20 used in the sensor shown in FIG. 3. From the data in FIG. 5, the wavelengths of the two fringes seen in FIG. 4 may be readily determined. Once the wavelengths of the two fringes are known, the gap length can be uniquely determined from equation (6).

If desired, the micropositioner 16 may be used to independently measure the gap length as a check on the interferometric technique of the present invention. However, it is difficult to place the mirror 12 against the end face 10 of the fiber optic 12 to obtain a gap of exactly zero. Consequently, it is difficult to directly measure the gap with the micropositioner 16 to within its resolution of 0.1 $\mu$m. To overcome this problem, the micropositioner 16 may be used to measure two or more different gap lengths, thus eliminating the need for a gap length of zero. The various gap lengths determined by the micropositioner 16 may then be compared to the gap lengths determined by the optical tuning method described above.

One advantage of the method of the present invention is that the range of strain values that can be measured is very large. By choosing appropriate sensor parameters the dynamic range of the readout technique may be several hundreds of percent strain. The strain resolution, however, will vary greatly depending on the particular sensor parameters.

As implied by FIG. 2, the minimum gap length that can be measured is limited the tuning range $\Delta\lambda$ of the laser diode that is employed. By using a laser diode with a large tuning range, a relatively small gap length can be measured, particularly if the measurements are taken at maxima and minima rather than a full 360 degree cycle.

The measurement of relatively large air gaps causes a number of difficulties. First, fringe contrast decreases due to longitudinal misalignment loss of the reflection that occurs across the gap. Additionally, there is angular misalignment loss due to bend loading, which is more severe for larger longitudinal gaps. Finally, large gaps will also cause problems for broad line sources that have a relatively short coherence length.

The resolution achieved by the method of the present invention depends on the ability to accurately measure the laser wavelength at a particular fringe. Several factors can be optimized to improve these measurements.

For example, by providing a smaller air gap the wavelength span between fringes will increase, thus reducing the effective error in wavelength measurement. The lower limit for gap length is imposed by the wavelength tuning range of the laser. Therefore a laser having a wide tuning range is advantageous. In addition, the resolution can be improved by setting the gauge length much larger than the gap length. A larger gauge length increases the change in gap length per unit change in strain.

The location of the fringe peaks can be more precisely measured by increasing the sharpness of the peaks. Sharper peaks are produced by higher finesse cavities. Increasing finesse can be accomplished by applying reflective coatings to the fiber ends within the cavity. A more accurate technique for measuring wavelength would also be advantageous. To this end an interferometric optical spectrum analyzer may be used at the source to measure the wavelength of light emitted by the laser.

The above is a detailed description of a particular embodiment of the invention. The full scope of the invention is set forth in the claims that follow and their equivalents. Accordingly, the claims and specification should not be construed to unduly narrow the full scope of protection to which the invention is entitled.

What is claimed is:

1. A method for sensing an environmental parameter comprising the steps of:

sensing the environmental parameter with an interferometer sensor having a light source emitting a tunable wavelength of light and a gap that changes in length in response to the environmental parameter, said interferometer having a sinusoidal output curve that oscillates in intensity in response to changes in gap length;

tuning the wavelength of light of the light source to a first wavelength to provide a first output value;

tuning the wavelength of light of the light source to a second wavelength to provide a second output value, said first and second output values corresponding to points on the sinusoidal output curve that differ by at least half a cycle;

calculating a gap length from the values of the first wavelength and the difference between the first wavelength and the second wavelength; and determining the value of the environmental parameter from the value of the gap length.

2. The method of claim 1 wherein the first output value corresponds to a value of maximum intensity.

3. The method of claim 1 wherein the first output value corresponds to a value of minimum intensity.

4. The method of claim 1 wherein the first and second output values correspond to points on the sinusoidal output curve that differ by a complete cycle.

5. The method of claim 2 wherein the first and second output values correspond to points on the sinusoidal output curve that differ by a complete cycle.

6. The method of claim 3 wherein the first and second output values correspond to points on the sinusoidal output curve that differ by a complete cycle.

7. The method of claim 1 wherein said interferometer comprises a Fabry-Perot interferometer.

8. The method of claim 1 wherein said light source comprises a laser diode.

9. The method of claim 8 wherein the steps of tuning the wavelength of light of the laser diode comprise the steps of tuning the wavelength of light by adjusting the temperature of the laser diode.

10. The method of claim 6 wherein the step of calculating the gap length comprises the step of calculating the gap length from the formula:

$$S \approx \frac{\lambda_1^2}{2\lambda_1 - \lambda_2}$$

where S is the gap length, $\lambda_1$ is the first wavelength and $\lambda_2$ is the second wavelength.

11. A method for determining gap length in an interferometer comprising the steps of:
providing first and second optical beams that interfere after at least one the beams traverse the gap, said first and second beams having tunable wavelengths, said interferometer having a sinusoidal output curve that oscillates in intensity in response to changes in gap length;
tuning the wavelength of light of the light source to a first wavelength to provide a first output value;
tuning the wavelength of light of the light source to a second wavelength to provide a second output value, said first and second output values corresponding to points on the sinusoidal output curve that differ by at least half a cycle; and
calculating the gap length from the values of the first wavelength and the difference between the first wavelength and the second wavelength.

12. The method of claim 11 wherein the first output value corresponds to a value of maximum intensity.

13. The method of claim 11 wherein the first output value corresponds to a value of minimum intensity.

14. The method of claim 11 wherein the first and second output values correspond to points on the sinusoidal output curve that differ by a complete cycle.

15. The method of claim 12 wherein the first and second output values correspond to points on the sinusoidal output curve that differ by a complete cycle.

16. The method of claim 13 wherein the first and second output values correspond to points on the sinusoidal output curve that differ by a complete cycle.

17. The method of claim 11 wherein said interferometer comprises a Fabry-Perot interferometer.

18. The method of claim 11 wherein said light source comprises a laser diode.

19. The method of claim 18 wherein the steps of tuning the wavelength of light of the laser diode comprise the steps of tuning the wavelength of light by adjusting the temperature of the laser diode.

20. The method of claim 16 wherein the step of calculating the gap length comprises the step of calculating the gap length from the formula:

$$S \approx \frac{\lambda_1^2}{2\lambda_1 - \lambda_2}$$

where S is the gap length, $\lambda_1$ is the first wavelength and $\lambda_2$ is the second wavelength.

* * * * *